(12) United States Patent
Iwasa et al.

(10) Patent No.: US 8,827,067 B2
(45) Date of Patent: Sep. 9, 2014

(54) CONVEYANCE APPARATUS

(75) Inventors: Seisaku Iwasa, Shiga (JP); Motoki Takayama, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 19 days.

(21) Appl. No.: 13/572,146

(22) Filed: Aug. 10, 2012

(65) Prior Publication Data
US 2013/0037383 A1    Feb. 14, 2013

(30) Foreign Application Priority Data

Aug. 12, 2011  (JP) ................. 2011-176836

(51) Int. Cl.
*B65G 47/24*  (2006.01)
*B65G 21/20*  (2006.01)
*B65G 21/00*  (2006.01)
*B65G 43/08*  (2006.01)

(52) U.S. Cl.
CPC ............ *B65G 21/2072* (2013.01); *B65G 21/00* (2013.01); *B65G 43/08* (2013.01)
USPC ....................................... 198/401

(58) Field of Classification Search
CPC ........................................ B65G 47/24
USPC ........................................ 198/401; 53/147
See application file for complete search history.

(56) References Cited

U.S. PATENT DOCUMENTS

| | | | |
|---|---|---|---|
| 4,837,715 A * | 6/1989 | Ungpiyakul et al. | 702/82 |
| 4,856,262 A * | 8/1989 | Uithoven | 53/499 |
| 5,284,003 A * | 2/1994 | Goodman et al. | 53/437 |
| 5,350,055 A * | 9/1994 | Lecrone | 198/718 |
| 5,553,925 A * | 9/1996 | Merten et al. | 299/1.1 |
| 6,430,895 B1 * | 8/2002 | Kitagawa et al. | 53/247 |
| 7,891,484 B2 * | 2/2011 | Ranger | 198/861.1 |
| 7,921,982 B2 * | 4/2011 | Moske et al. | 198/418.9 |
| 2005/0172736 A1 * | 8/2005 | Kumagai et al. | 73/865.8 |
| 2010/0115886 A1 * | 5/2010 | Takayama et al. | 53/147 |
| 2011/0023422 A1 | 2/2011 | Takayama et al. | |
| 2011/0232228 A1 * | 9/2011 | Iwasa et al. | 53/147 |

FOREIGN PATENT DOCUMENTS

| | | |
|---|---|---|
| JP | 2011-31989 A | 2/2011 |
| JP | 2011-031989 A | 2/2011 |

OTHER PUBLICATIONS

Extended European Search Report of the corresponding European Patent Application No. 12180026.2, dated Nov. 9, 2012.

* cited by examiner

*Primary Examiner* — Ramya Burgess
*Assistant Examiner* — Thomas Randazzo
(74) *Attorney, Agent, or Firm* — Global IP Counselors, LLP

(57) ABSTRACT

A conveyance apparatus aligns conveyed packaging bags. In the conveyance apparatus, a thickness measurement part measures the thickness of a packaging bag. A controller infers that the width of the packaging bag has decreased when the thickness of the packaging bag is greater than a reference thickness, and the controller causes a first guide member to move so as to approach a second guide member via a guide drive part. In addition, the controller infers that the width of the packaging bag has increased when the thickness of the packaging bag is less than the reference value, and the controller causes the first guide member to move so as to be distanced from the second guide member via the guide drive part.

10 Claims, 6 Drawing Sheets

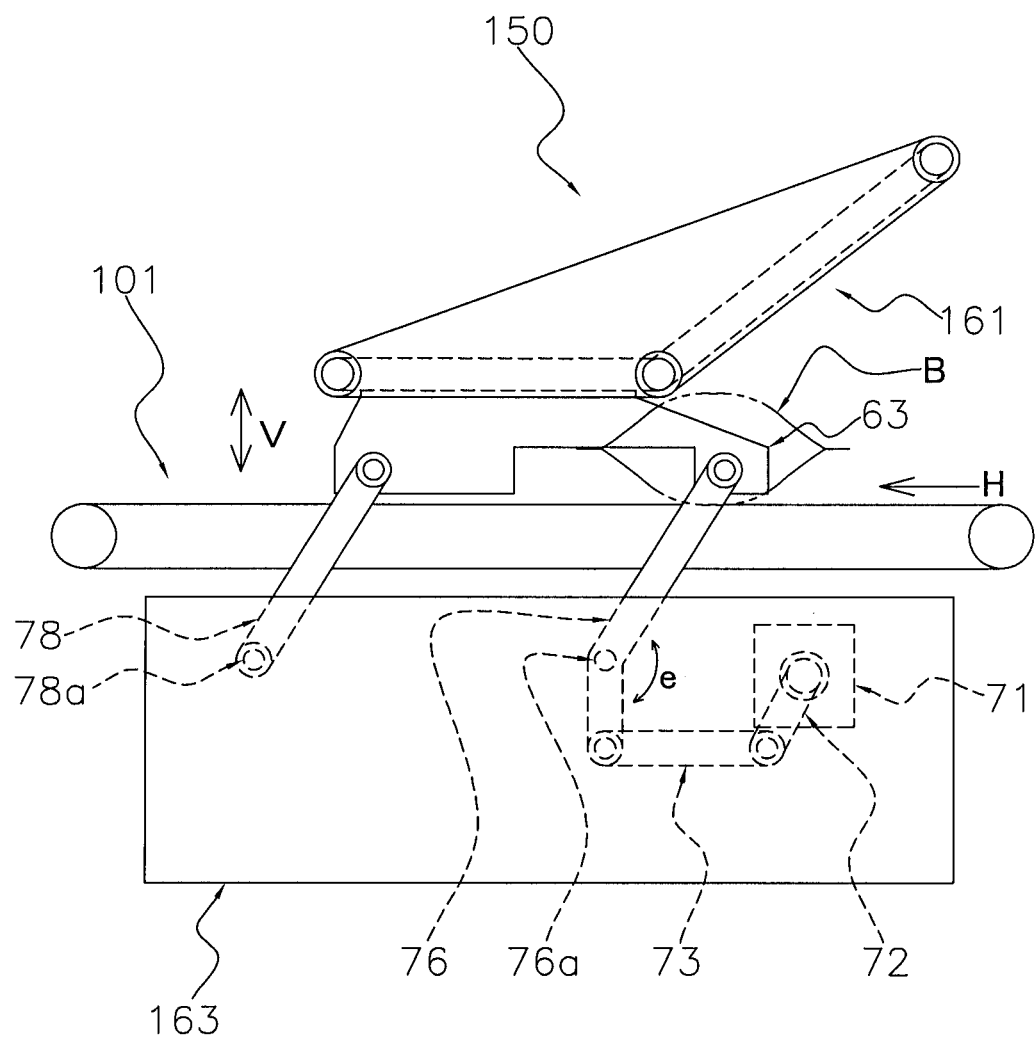
F I G. 2

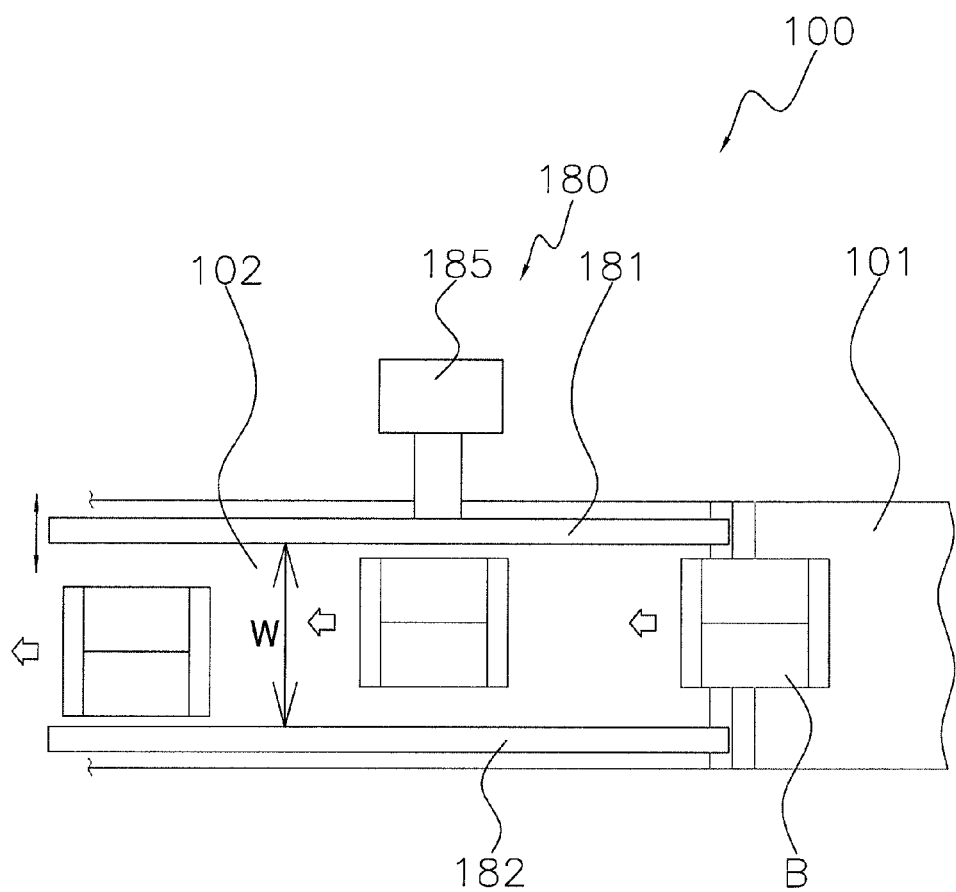
F I G. 3

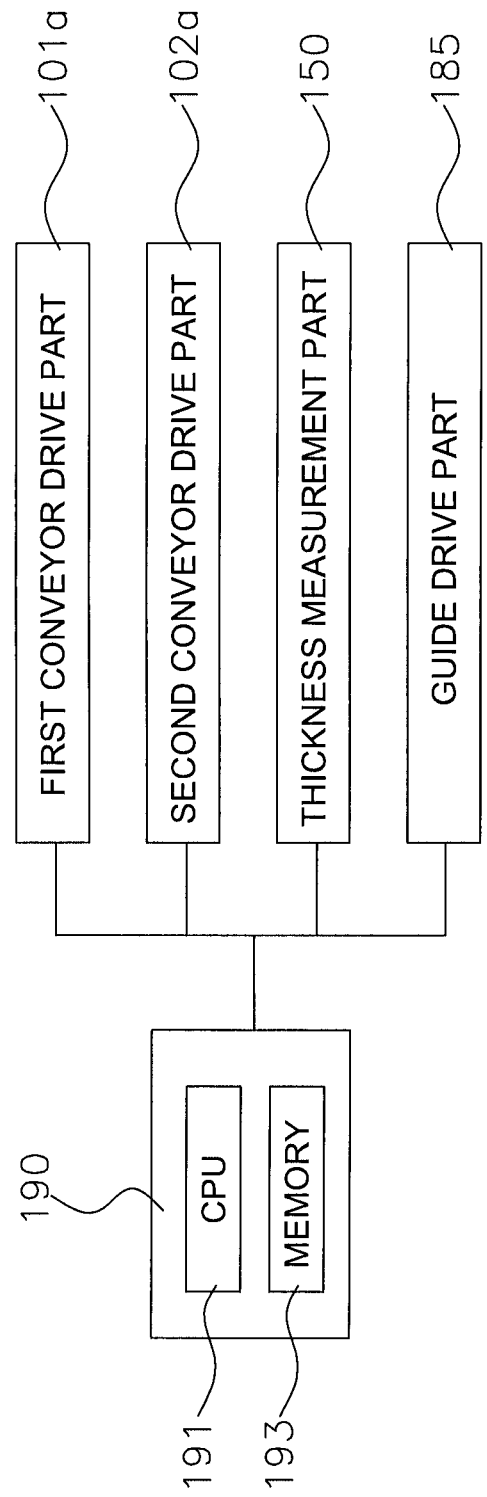
F I G. 4

CONVEYANCE APPARATUS

TECHNICAL FIELD

The present invention relates to a conveyance apparatus for conveying a packaging bag while positioning the bag into a linear aligned orientation.

BACKGROUND ART

In a conventional process for accumulating pillow-type packaging bags in a linear arrangement, a guide member is provided upstream of the bags, and the procession of the packaging bags is controlled so as to be linearly shaped. For example, in the first conveyance apparatus disclosed in Patent Literature 1 (Japanese Laid-Open Patent Publication No. 2011-31989), guide members are provided to both sides of a horizontal part through which the packaging bags are horizontally conveyed, and the guide members inhibit a disturbance in the line of packaging bags.

SUMMARY OF THE INVENTION

Technical Problem

However, even in a conveyance apparatus such as that described above, the width of the packaging bag varies during actual operation, and obstructions arise such as the inability to pass due to interference with the guide members, a disturbance of the line due to unsuitable restriction of the guide members, or the like.

An object of the present invention is to provide a conveyance apparatus in which the aligned state of conveyed packaging bags is inhibited from being disturbed by a variation in the width of the packaging bags.

Solution to Problem

A conveyance apparatus according to a first aspect of the present invention is a conveyance apparatus for adjusting a lateral position of a bag while conveying the bag having a vertical length, a horizontal width, and a thickness managed to a predetermined tolerance, the conveyance apparatus comprising a conveyor, guide members, a thickness measurement part, and a controller. The conveyor has a horizontal conveyance surface configured to move in a conveying direction. The guide members are located above the conveyor and are configured to make contact with opposite lateral side parts of the bag in the width direction and change the lateral position of the bag in the lateral direction perpendicular to the conveying direction. The thickness measurement part measures the thickness of the bag. The controller causes the guide members to move in the lateral direction of the bag in response to measurement of the thickness of the bag.

In this conveyance apparatus, it is inferred that a bag having a thickness greater than that of a reference value has a decreased bag width, and the controller causes the guide members to move so as to approach the bag, whereby a disturbance of the line of bags advancing along the horizontal conveyance surface is inhibited. In addition, it is inferred that a bag having a thickness less than that of a prescribed reference value has an increased bag width, and the controller causes the guide members to move so as to be distanced from the bag, whereby a disturbance of the line is inhibited without hindering the passage of the bags advancing along the horizontal conveyance surface.

A conveyance apparatus according to a second aspect of the present invention is the conveyance apparatus according to the first aspect, wherein the controller reduces a gap defined between the guide members when the measurement of the thickness of the bag is equal to or greater than a prescribed reference value, and increases the gap between the guide members when the measurement value of the measured thickness of the bag is less than the prescribed reference value. In this conveyance apparatus, the same effect is achieved as in the first aspect.

A conveyance apparatus according to a third aspect of the present invention is the conveyance apparatus according to the first aspect, wherein the thickness measurement part is positioned on an upstream side of the conveyor relative to the guide members.

In this conveyance apparatus, in addition to the effect of the first aspect, the thickness of the bag is measured on the upstream side of the conveyor, whereby the position of the guide member can be changed and the bag can be received, and a situation is therefore avoided in which the movement of the guide members is slowed and then the line of bags is disturbed.

A conveyance apparatus according to a fourth aspect of the present invention is the conveyance apparatus according to the first aspect, wherein the controller includes memory storing a correlation map that includes data corresponding to movement amounts of the guide members correlated with measured thicknesses of the bag.

In this conveyance apparatus, in addition to the effect of the first aspect, a correlation map is stored in memory. The correlation map includes data such as various possible thicknesses of the bag divided into predetermined ranges, with each predetermined range correlated or linked to a corresponding movement amount of the guide members. Control is therefore simpler than when performed by calculating the movement amount of the guide members for every bag on the basis of the measured thickness of the bags.

A conveyance apparatus according to a fifth aspect of the present invention is the conveyance apparatus according to the first aspect, wherein the controller is configured to control movement of the guide members in response to a moving average of values measured by the thickness measurement part.

In this conveyance apparatus, in addition to the effect of the first aspect, the guide members are caused to move on the basis of the moving average of the measurement values, and the guide members can therefore be moved in accordance with the change of distribution of the measurement values, and reasonable, yet unnecessary vibration can be inhibited. The reason for this is that the thickness of the bag varies gradually in accordance with the variation in elapsed time and temperature conditions rather than varying suddenly, and it is not reasonable that the guide members be moved every time the thickness of the bag is measured, which is a further cause of vibrations.

A conveyance apparatus according to a sixth aspect of the present invention is the conveyance apparatus according to the first aspect, wherein the thickness measurement part measures the thickness of the bag by applying pressure in the thickness direction of the bag, and simultaneously performs a seal check of the bag during measurement.

In this conveyance apparatus, in addition to the effect of the first aspect, the thickness can be measured in combination with a seal check using the fact that the thickness of the bag is reduced at the time of measurement when an abnormality in the sealing properties of the bag is present.

A conveyance apparatus according to a seventh aspect of the present invention is the conveyance apparatus according to the first aspect, wherein the guide members include at least one pivoting member for pivoting around a predetermined portion as a support point.

In this conveyance apparatus, the guide member approaches or is distanced from the bag in accordance with the bag thickness, whereby the line of bags advancing along the horizontal conveyance surface is inhibited from being disturbed. In addition, the pivoting member pivots, whereby the movement of the bag is guided by an orientation in which the pivoting member is sloped relative to the proceeding direction of the horizontal conveyance surface. The line of bags is therefore directed in a predetermined direction while a disturbance of the line is inhibited.

Advantageous Effects of Invention

In the conveyance apparatus of the present invention, it is inferred that a bag having a thickness greater than that of a reference value has a decreased bag width, and the controller causes the guide members to move so as to approach the bag, whereby a disturbance of the line of bags advancing along the horizontal conveyance surface is inhibited. In addition, it is inferred that a bag having a thickness less than that of a reference value has an increased bag width, and the controller causes the guide members to move so as to be distanced from the bag, whereby a disturbance of the line is inhibited without hindering the passage of the bags advancing along the horizontal conveyance surface.

BRIEF DESCRIPTION OF THE DRAWINGS

FIG. 2 is a lateral view of a first conveyor.

FIG. 3 is a plan view of a second conveyor.

FIG. 4 is control block diagram of the conveyance apparatus.

DESCRIPTION OF EMBODIMENTS

An embodiment of the present invention will be described with reference to the drawings. The embodiment described below is a single specific example of the present invention and does not limit the technical scope of the present invention.

First Embodiment (1) Configuration of Conveyance Apparatus 100

Figure 1:
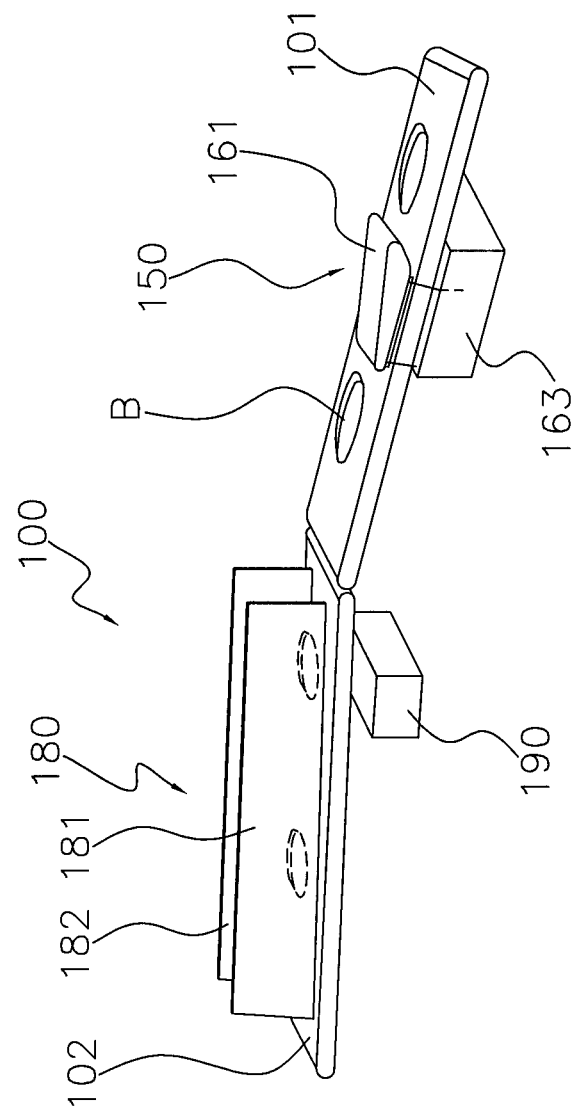
FIG. 1 is a perspective view of a conveyance apparatus according to a first embodiment of the present invention.

FIG. 1 is a perspective view of a conveyance apparatus 100 according to a first embodiment of the present invention. In FIG. 1, the conveyance apparatus 100 comprises a first conveyor 101, a second conveyor 102, a thickness measurement part 150, a guide part 180, and a controller 190. The conveyance apparatus 100 is configured to convey a plurality of packaging bags while positioning the bags one by one such that at least one lateral side of each packaging bag is in an aligned orientation with the other packaging bags.

(1-1) First Conveyor 101

FIG. 2 is a lateral view of the first conveyor 101. In FIG. 2, the first conveyor 101 is a conveyor for conveying a pillow-type packaging bag B toward the second conveyor 102. The thickness measurement part 150 is movably disposed on the first conveyor 101. In addition, a first conveyor drive part 101a, such as an electric motor (shown in FIG. 4) for driving the first conveyor 101, is provided on the side of or below the first conveyor 101.

(1-2) Thickness Measurement Part 150

The thickness measurement part 150 has an upper conveyor 161 supported and positioned above the first conveyor 101, and an elevating mechanism 163 for elevating the upper conveyor 161 relative to the first conveyor 101. The elevating mechanism 163 includes an elevating frame 63, a servomotor 71, a lever 72, a relay link 73, a first link 76, and a second link 78.

One end part of the lever 72 is attached to an output shaft of the servomotor 71. One end part of the linear relay link 73 is linked to the other end part of the lever 72.

One end part of the boomerang-shaped first link 76 is linked to the other end part of the relay link 73. The other end part of the first link 76 is linked to a right-side end part of the elevating frame 63. The right-side end part refers to the end part disposed on the upstream side of the conveyance direction. In addition, the first link 76 can swing around a support shaft 76a in the direction of arrow "e."

One end part of the second link 78 is attached so as to allow free rotation around a support shaft 78a, and the other end part is linked to a left-side end part of the elevating frame 63. The servomotor 71 therefore causes the lever 72 to rotate, whereby the first link 76 and the second link 78 swing, and the elevating frame 63 can move in the direction of arrow V while a parallel relationship between the upper conveyor 161 and the first conveyor 101 is maintained. The left-side end part refers to the end part disposed on the downstream side of the conveyance direction.

The elevating frame 63 raises the upper conveyor 161 so that a gap between the first conveyor 101 and the upper conveyor 161 has a value slightly less than the thickness of the packaging bag B.

When the packaging bag B proceeds along the first conveyor 101, the gap between the first conveyor 101 and the upper conveyor 161 in an initial state is slightly less than the thickness of the packaging bag B, and the upper conveyor 161 is therefore lifted up by the progression of the packaging bag B in the H direction.

The packaging bag B sandwiched by a conveyance surface of the first conveyor 101 and a conveyance surface of the upper conveyor 161 is pressed by a predetermined force transmitted from the servomotor 71 while the packaging bag is conveyed. The gap between the first conveyor 101 and the upper conveyor 161 at this time is detected as the thickness of the packaging bag B. The thickness detected in this manner is saved in a memory 193 (refer to FIG. 4) of the controller 190.

A seal is determined to be defective if the gap is suddenly reduced when the packaging bag B is pressed between the upper conveyor 161 and the first conveyor 101. That is, the thickness measurement part 150 is dually provided with a seal check function. Specifically, the thickness measurement part 150 measures the thickness of the packaging bag B and simultaneously tests the sealed sections of the packaging bag B.

(1-3) Second Conveyor 102

In FIG. 1, the second conveyor 102 is a conveyor for conveying the packaging bag B in a conveying direction to the next step after the thickness has been measured by the thickness measurement part 150 and in which no sealing problems exist, while causing the packaging bag B to be linearly aligned. In addition, a second conveyor drive part 102a, for instance, an electric motor (shown in FIG. 4) for driving the second conveyor 102, is provided on the side of or below the second conveyor 102. Furthermore, a guide part 180 is disposed on a horizontal conveyance surface of the second conveyor 102.

(1-4) Guide Part 180

The guide part 180 has a first guide member 181 and a second guide member 182. The first guide member 181 and the second guide member 182 are rectangular wall or tabular members, and are disposed so as to sandwich, from both sides, a track along which the packaging bag B moves. The first guide member 181 and the second guide member 182 are not limited to being tabular members, and at least one of the first guide member 181 and the second guide member 182 may be a side conveyor belt or endless belt.

FIG. 3 is a top plan view of the second conveyor 102. In FIG. 3, a gap W defined between the first guide member 181 and the second guide member 182 is set to be larger than the dimensions of the packaging bag B in the width direction. The gap W can be changed or adjusted to an extent that does not hinder conveyance of the packaging bag B. The gap W is changed by moving the first guide member 181 in a direction perpendicular to the conveying direction approaching the second guide member 182.

The drive part for causing the first guide part 181 to move may be suitably adopted from an electric cylinder and/or a servomotor, or the like. In the present embodiment, the guide part 180 has, on the outside of the first guide member 181, a guide drive part 185 for housing a servomotor and a ball-screw mechanism for converting the rotation of the servomotor to linear movement. The guide drive part 185 is controlled by the controller 190.

(1-5) Controller 190

FIG. 4 is a control block diagram of the conveyance apparatus 100. In FIG. 4, the controller 190 is electrically connected to a first conveyor drive part 101*a* for driving the first conveyor 101, a second conveyor drive part 102*a* for driving the second conveyor 102, the thickness measurement part 150, and the guide drive part 185. In addition, the controller 190 has at least a CPU 191 and a memory 193.

The thickness measurement values of the packaging bags B detected by the thickness measurement part 150 are saved in the memory 193. In addition, the moving average is computed in sequence every n number of bags from the measured thickness values of the packaging bags B saved in the memory 193. The position of the first guide member 181 is changed in a direction in which the gap W is reduced in cases in which the value of the moving average exceeds a reference value set in advance, and the position of the first guide member 181 is changed in a direction in which the gap W is increased in cases in which the value of the moving average does not reach the reference value set in advance.

In addition, a correlation map is previously constructed and stored in memory. The correlation map includes data including measurements of various thicknesses of the packaging bag B divided into predetermined ranges. The correlation map links each predetermined range of the measured thickness of the packaging bag to a predetermined movement amount, and the correlated data or results are saved in the memory 193. Accordingly, the first guide member 181 moves by only the movement amount commensurate with the data in the correlation map corresponding to the appropriate one of the divisions, which includes the moving average of the thickness measurement value of the packaging bag B.

The movement amount is the movement amount from the initial position of the first guide member 181, and control methods therefore include a method in which the first guide member 181 is moved by only the movement amount after the first guide member 181 has returned to the initial position, and a method in which the movement amount from the initial position is constantly saved, and the first guide member 181 is moved by only the difference between the initial position and the newest movement amount. The former is preferable in cases in which the capacity of the memory 193 has been inhibited.

(2) Operation of Conveyance Apparatus 100

The controller 190 drives the servomotor 71 and presses the packaging bag B against the upper conveyor 161 using a predetermined force when progression of the packaging bag B conveyed along the first conveyor 101 is detected between the first conveyor 101 and the upper conveyor 161 of the thickness measurement part 150. The thickness of the packaging bag B is computed from the amount of rotation required in order for the servomotor 71 to press the packaging bag B, and the result is saved in the memory 193 as the thickness measurement value.

The controller 190 rejects the packaging bag B as a defectively sealed item midway from the first conveyer 101 to the second conveyor 102 when the thickness of the packaging bag B pressed by the upper conveyer 161 is suddenly reduced.

The packaging bag B in which the thickness was measured by the thickness measurement part 150 and in which no sealing problems exist is carried from the first conveyor 101 to the second conveyor 102, and is advanced between the first guide member 181 and the second guide member 182 of the guide part 180. The controller 190 controls the operation of the guide part 180 after the thickness of the packaging bag B has been measured, and this control will be described with reference to the control flow of the guide part 180.

Figure 5:
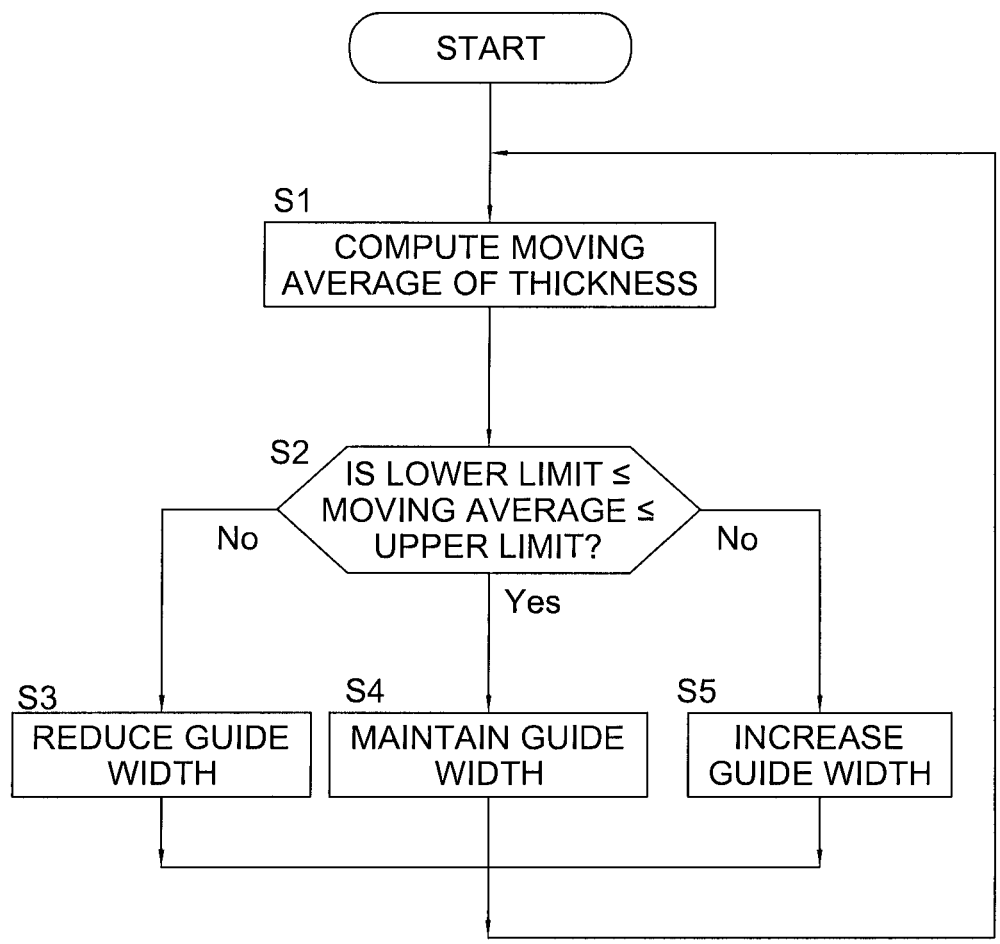
FIG. 5 is a control flowchart of a guide part.

FIG. 5 is a control flowchart of the guide part 180. In FIG. 5, the controller 190 computes the moving average in step S1 in sequence every n number of bags from the thickness measurement value saved in the memory 193. In step S2, the controller 190 determines whether the value of the moving average exceeds the upper limit of the reference value, is within the range of the reference value, or is less than the lower limit of the reference value.

When the value of the moving average exceeds the upper limit of the reference value, the controller 190 performs step S3. In step S3, the controller 190 changes the position of the first guide member 181 using the guide drive part 185 so that the gap W is reduced.

When the value of the moving average remains within the range of the reference value, the controller 190 performs step S4. In step S4, the controller 190 maintains the present gap W without moving the guide drive part 185.

When the value of the moving average is less than the lower limit of the reference value, the controller 190 performs step S5. In step S5, the controller 190 changes the position of the first guide member 181 via the guide drive member 185 so that the gap W increases.

In cases in which the position of the thickness measurement part 150 and the position of the guide part 180 are at a considerable distance from each other, a large deviation occurs between the point in time when measurement occurred and the point in time when the guide part 180 is moved, and it is therefore necessary to move the guide part 180 with a time difference provided from the point in time when the thickness is measured.

(3) Characteristics (3-1)

In the conveyance apparatus 100, the thickness measurement part 150 measures the thickness of the packaging bag B. The controller 190 infers that the width of the packaging bag B has decreased when the thickness of the packaging bag B becomes greater than the reference thickness, and the controller 190 causes the first guide member 181 to move so as to approach the second guide member 182 via the guide drive part 185. In addition, the controller 190 infers that the width of the packaging bag B has increased when the thickness of the packaging bag B becomes less than the reference thickness, and causes the first guide member 181 to move so as to be distanced from the second guide member 182 via the guide drive part 185. As a result, a disturbance of the line is inhibited without hindering the passage of the packaging bag B advancing along the horizontal conveyance surface.

(3-2)

In the conveyance apparatus 100, the thickness measurement part 150 measures the thickness of the packaging bag B on the first conveyor 101, which is on the upstream side of the second conveyor 102. The guide part 180 therefore receives the packaging bag B after the thickness is measured, and a situation is prevented in which the movement of the first guide member 181 is slowed and then the line of the packaging bags B is disturbed.

(3-3)

In the conveyance apparatus 100, as described above, the correlation map includes various measured thicknesses of the packaging bags B are divided into predetermined ranges. The correlation map is created correlating or linking each predetermined range (or division) to a corresponding movement amount of the first guide member 181, and the results are saved in the memory 193. Control is therefore simpler than when the movement amount of the first guide member 181 for every packaging bag B is computed on the basis of the thickness dimension of the packaging bag B.

(3-4)

In the conveyance apparatus 100, the movement amount of the first guide member 181 is determined on the basis of the moving average of the n number of thickness measurement values of the packaging bag B. As a result, the first guide member 181 can be moved in accordance with the change of the distribution of measurement values, and reasonable, yet unnecessary vibrations can be inhibited.

(3-5)

In the conveyance apparatus 100, the thickness can be measured in combination with a seal check using the fact that the thickness of the packaging bag is suddenly reduced at the time of measurement when an abnormality in the sealing properties of the packaging bag B is present.

(4) Modifications

In the aforedescribed embodiment, the second guide member 182 is secured, and only the first guide member 181 moves to change the gap W, but no limitation is imposed thereby.

For example, it is also possible to use a configuration in which a drive part is also provided to the second guide member 182 side, and the first guide member 181 and the second guide member 182 each move half of the movement amount decided by the control part 190.

Second Embodiment (1) Configuration of Conveyance Apparatus 200

In the first embodiment, the first guide member 181 of the guide part 180 extends parallel to the second guide member 182 and moved in a direction perpendicular to a lengthwise direction of the second guide member 182, as indicated by the arrows at the left side of FIG. 3, whereby the gap W is changed or adjusted, but the operation of the first guide member 181 is not limited thereby.

The guide part 180 exists in order to contact the side part of the packaging bag B in the width direction and to change the lateral position of the packaging bag B relative to the width or lateral direction, and the minimal width necessary for the packaging bag B to pass through, that is, the gap between the downstream ends of the first guide member 181 and the second guide member 182, may be regulated by the pivoting of the first guide member 181.

Figure 6:
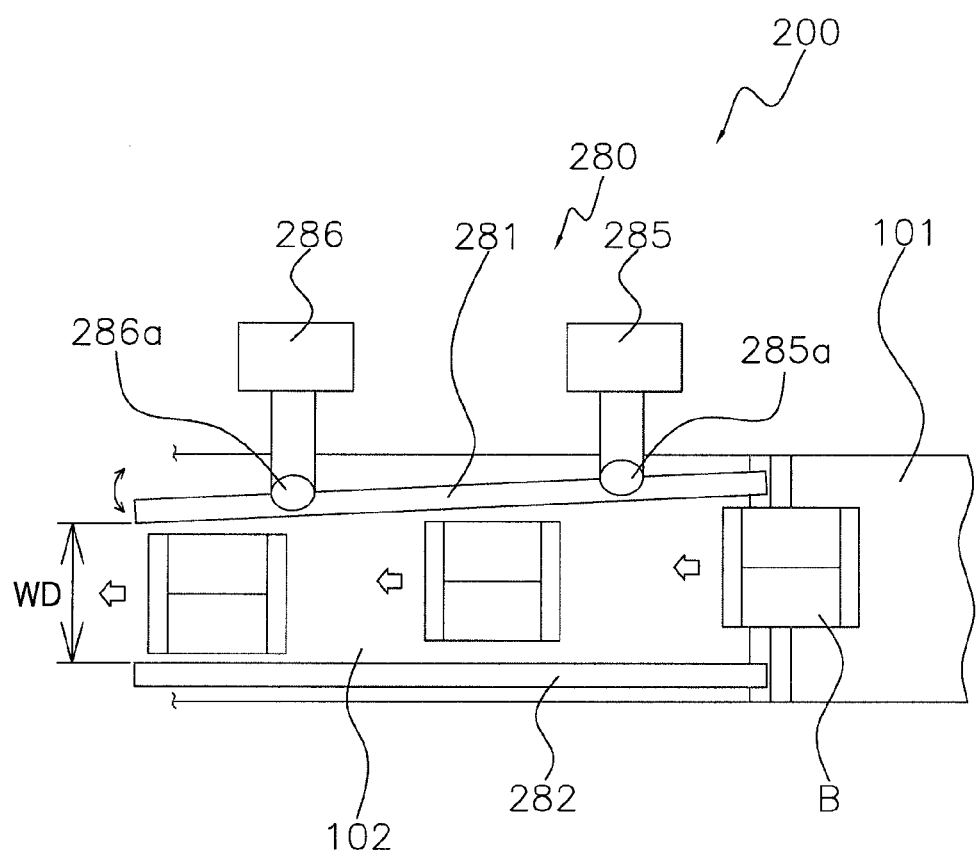
FIG. 6 is a plan view of the second conveyor of the conveyance apparatus according to a second embodiment.

FIG. 6 is a plan view of the second conveyor of the conveyance apparatus 200 according to a second embodiment. The conveyance apparatus 200 according to the second embodiment has a configuration in which the guide part 180 of the conveyance apparatus 100 according to the first embodiment has been changed to a guide part 280. Accordingly, only the guide part 280 will be described in the following detailed description of the configuration.

(2) Configuration of Guide Part 280

The guide part 280 has a first guide member 281 and a second guide member 282. The first guide member 281 and the second guide member 282 are rectangular tabular members, and are disposed so as to sandwich, from both sides, a track along which the packaging bag B moves. The first guide member 281 and the second guide member 282 are not limited to being wall or tabular members, and at least one of the first guide member 281 and the second guide member 282 may be a conveyor-like side belt.

In FIG. 6, the first guide member 281 is sloped so that a gap between the first guide member 281 and the second guide member 282 is reduced toward the downstream side, and a gap WD between the downstream ends of the first guide member 281 and the second guide member 282 is regulated by changing the slope angle of the first guide member 281. The slope angle of the first guide member 281 is an angle relative to the movement direction of the conveyance surface of the second conveyor 102.

The gap WD is set to be greater than the dimensions of the packaging bag B in the width or lateral direction, but can be changed to an extent that does not hinder conveyance of the packaging bag B. The gap WD is changed by pivoting the first guide member 281 so that the downstream end of the first guide member 281 approaches the second guide member 282. That is, the first guide member 281 is a pivoting member.

A drive part for causing the first guide member 281 to pivot may be suitably adopted from an electric cylinder and/or a servomotor, or the like. In the second embodiment, the guide part 280 has a first drive part 285 and a second drive part 286. The first drive part 285 and the second drive part 286 house, on the outside of the first guide member 281, a servomotor and a ball-screw mechanism for converting the rotation of the servomotor to linear movement.

The first drive part 285 pivotably supports the first guide member 281 via a first support part 285a. In addition, the second drive part 286 pivotably supports the first guide member 281 via a second support part 286a. Furthermore, the first drive part 285 and the second drive part 286 are controlled by the controller 190 (refer to FIG. 4). Hence, in the second embodiment, the first guide member 281 is not required to extend parallel to the second guide member 282. Rather, the first guide member 281 is angularly offset from a line parallel to the second guide member 282 such that the first guide member 281 and the second guide member 282 have a funnel-like appearance when viewed from above, as in FIG. 6.

(3) Operation of Guide Part 280

For example, when the gap WD in FIG. 6 is further reduced, the controller 190 presses the second support part 286a toward the second guide member 282 side via the second drive part 286, whereby the first guide member 281 pivots around the first support part 285a as a support point, the downstream end of the first guide member 281 approaches the downstream end of the second guide member 282, and the gap WD decreases.

Conversely, when the gap WD in FIG. 6 is further increased, the controller 190 pulls the second support member 286a in a direction distanced from the second guide member 282 via the second drive part 286, whereby the first guide member 281 is pivoted around the first support part 285a as a support point, the downstream end of the first guide member 281 is distanced from the downstream end of the second guide member 282, and the gap WD is increased.

In addition, when the gap WD is further reduced without a change in the slope angle of the first guide member 281 in FIG. 6, the controller 190 presses the first support part 285a and the second support part 286a the same distance toward the second guide member 282 side via the first drive part 285 and the second drive part 286, whereby the first guide member 281 approaches the second guide member 282 without a change in slope angle, and the gap WD decreases.

Conversely, when the gap WD is further increased without a change in the slope angle of the first guide member 281 in FIG. 6, the controller 190 pulls the first support part 285a and the second support part 286a the same distance in a direction distanced from the second guide member 282 via the first drive part 285 and the second drive part 286, whereby the first guide member 281 is distanced from the second guide member 282 without a change in slope angle, and the gap WD is increased.

(4) Operation of Conveyance Apparatus 200

In FIGS. 1 and 2, the controller 190 drives the servomotor 71 and presses the packaging bag B against the upper conveyor 161 using a predetermined force when progression of the packaging bag B conveyed along the first conveyor 101 is detected between the first conveyor 101 and the upper conveyer 161 of the thickness measurement part 150. The thickness of the packaging bag is computed from the amount of rotation required in order for the servomotor 71 to press the packaging bag B, and the result is saved in the memory 193 as the thickness measurement value.

The controller 190 rejects the packaging bag B as a defectively sealed item midway from the first conveyor 101 to the second conveyor 102 when the thickness of the packaging bag B pressed by the upper conveyer 161 is suddenly reduced.

The packaging bag B in which the thickness was measured by the thickness measurement part 150 and in which no sealing problems exist is carried from the first conveyor 101 to the second conveyor 102, and is advanced between the first guide member 281 and the second guide member 282 of the guide part 280, as shown in FIG. 6. The controller 190 controls the operation of the guide part 280 after the thickness of the packaging bag B is measured.

The controller 190 computes the moving average in sequence every n number of bags from the thickness measurement values saved in the memory 193 (refer to FIG. 4). The controller 190 then determines whether the value of the moving average exceeds the upper limit of the reference value, is within the range of the reference value, or is less than the lower limit of the reference value. When the value of the moving average exceeds the upper limit of the reference value, the controller 190 changes the slope angle of the first guide member 281 so that the gap WD is reduced by the first drive part 285 and the second drive part 286.

When the value of the moving average remains within the range of the reference value, the controller 190 maintains the present gap WD without moving the first drive part 285 and the second drive part 286.

When the value of the moving average is less than the lower limit of the reference value, the controller 190 changes the slope angle of the first guide member 281 so that the gap WD is increased via the first drive part 285 and the second drive part 286.

In cases in which the position of the thickness measurement part 150 and the position of the guide part 280 are at a considerable distance from each other, a large deviation occurs between the point in time when measurement occurred and the point in time when the guide part 280 is moved, and it is therefore necessary to move the guide part 280 with a time difference provided from the point in time when the thickness is measured.

(5) Characteristics

In the conveyance apparatus 200, the first guide member 281 can pivot around the first support part 285a or the second support part 286a as a support point. The first guide member 281 pivots, whereby the movement of the packaging bag B is guided by a sloped orientation relative to the movement direction of the horizontal conveyance surface of the second conveyor 102. A disturbance of the line of packaging bags B is therefore inhibited, and the bags can be directed in a predetermined direction.

INDUSTRIAL APPLICABILITY a. The present invention as described above is not limited to pillow-type packaging bags, and is useful for conveyance of aligned bags in which the thickness is varied when pressed.

What is claimed is:

1. A conveyance apparatus for adjusting a lateral position of each of a plurality of bags while conveying the plurality of bags, each of the plurality of bags having its own vertical length, horizontal width, and thickness, the conveyance apparatus comprising:
    a conveyor having a horizontal conveyance surface configured to move in a conveying direction;
    guide members located above the conveyor configure to make contact with opposite lateral side parts of each of the plurality of bags in the lateral direction and changing the lateral position of each of the plurality of bags in the lateral direction perpendicular to the conveying direction of the conveyor;
    a thickness measurement part located upstream in the conveying direction relative to the guide members for measuring the thickness of each of the plurality of bags; and
    a controller for causing the guide members to move in the lateral direction relative to each of the plurality of bags in response to measurement of the thickness of each of the plurality of bags such that the plurality of bags are moved by the guide members to a linearly aligned orientation downstream of the guide members in the conveying direction, and
    wherein the controller includes memory storing a correlation map that includes data corresponding to movement amounts of the guide members correlated with the measured thickness of the plurality of bags.

2. The conveyance apparatus according to claim 1, wherein the controller is configured to reduce a gap defined between the guide members in response to the measurement of the thickness of any one the plurality of bags being equal to or greater than a prescribed reference value; and
    the controller is configured to increase the gap between the guide members in response to the measurement value of the thickness of any one the plurality of bags being less than the prescribed reference value.

3. The conveyance apparatus according to claim 1, wherein the thickness measurement part is positioned on an upstream side of the conveyor relative to the guide members.

4. The conveyance apparatus according to claim 1, wherein the controller is configured to control movement of the guide members in response to a moving average of values measured by the thickness measurement part.

5. The conveyance apparatus according to claim 1, wherein the thickness measurement part measures the thickness of each of the plurality of bags by applying pressure in the thickness direction of each of the plurality of bags, and simultaneously performs a seal check of each of the plurality of bags during measurement.

6. The conveyance apparatus according to claim 1, wherein the guide members include at least one pivoting member for pivoting around a predetermined portion as a support point.

7. The conveyance apparatus according to claim 2, wherein the thickness measurement part is positioned on an upstream side of the conveyor relative to the guide members.

8. The conveyance apparatus according to claim 2, wherein the controller includes memory storing a correlation map that includes data corresponding to movement amounts of the guide members correlated with the measured thickness of each of the plurality of bags.

9. The conveyance apparatus according to claim 2, wherein the controller is configured to control movement of the guide members in response to a moving average of values measured by the thickness measurement part.

10. The conveyance apparatus according to claim 2, wherein the thickness measurement part measures the thickness of each of the plurality of bags by applying pressure in the thickness direction of the bag, and simultaneously performs a seal check of each of the plurality of bags during measurement.

* * * * *